(12) United States Patent
Oroskar et al.

(10) Patent No.: US 9,705,803 B1
(45) Date of Patent: Jul. 11, 2017

(54) NEGOTIATED RADIO LINK PROPERTIES AMONG WIRELESS ACCESS NODES

(71) Applicant: Sprint Communications Company L.P., Overland Park, KS (US)

(72) Inventors: Siddharth Oroskar, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 79 days.

(21) Appl. No.: 14/735,346

(22) Filed: Jun. 10, 2015

(51) Int. Cl.
*H04W 4/00* (2009.01)
*H04L 12/801* (2013.01)
*H04W 28/02* (2009.01)
*H04W 36/00* (2009.01)

(52) U.S. Cl.
CPC ......... *H04L 47/14* (2013.01); *H04W 28/0273* (2013.01); *H04W 36/0055* (2013.01)

(58) Field of Classification Search
CPC .... H04L 1/0007; H04W 92/20; H04W 36/14; H04W 36/26; H04W 36/066; H04W 36/165; H04W 36/18; H04W 92/20
See application file for complete search history.

(56) References Cited

U.S. PATENT DOCUMENTS

| | | | |
|---|---|---|---|
| 8,094,682 B2 | 1/2012 | Pani et al. | |
| 8,483,238 B2 | 7/2013 | Ozturk et al. | |
| 8,498,284 B2 | 7/2013 | Pani et al. | |
| 8,514,779 B2 | 8/2013 | Ozturk et al. | |
| 2008/0188224 A1* | 8/2008 | Pani | H04W 36/02 455/436 |
| 2008/0270528 A1* | 10/2008 | Girardeau | H04L 1/0007 709/203 |
| 2011/0249563 A1 | 10/2011 | Provvedi et al. | |
| 2013/0329694 A1* | 12/2013 | Vrzic | H04W 36/165 370/331 |
| 2015/0244429 A1* | 8/2015 | Zhang | H04B 7/024 370/329 |
| 2016/0279475 A1* | 9/2016 | Aragones | G06F 19/3437 |

FOREIGN PATENT DOCUMENTS

CN WO 2011110124 A2 * 9/2011 ........... H04L 1/0007

OTHER PUBLICATIONS

"Performance Evaluation of Adaptive RLC PDU size in HSPA+ Networks," Jul. 18, 2013; 17 pages; Qualcomm; https://www.qualcomm.com/documents/qualcomm-research-performance-evaluation-adaptive-rlc-pdu-size-hspa-networks.

* cited by examiner

*Primary Examiner* — Maharishi Khirodhar (57) ABSTRACT

Systems, methods, apparatuses, and software for operating a wireless access node are provided herein. In one example, a method includes providing wireless access from the wireless access node for one or more wireless devices using an initial protocol data unit (PDU) size for at least a portion of the wireless access. The method also includes receiving wireless transmission metrics transferred by a second wireless access node, and establishing a new PDU size for the portion of the wireless access at the wireless access node based at least on the wireless transmission metrics.

16 Claims, 6 Drawing Sheets

| | LOCAL PERFORMANCE METRICS | | | REMOTE PERFORMANCE METRICS | |
|---|---|---|---|---|---|
| QCI | RETRANSMISSION RATE | PDU | TYPE OF COMMUNICATION | RETRANSMISSION RATE | PDU |
| 1 | 0.005% | 2 | VoIP CALL | 0.001% | 3 |
| 2 | 0.0010% | 4 | VIDEO CALL | 0.0015% | 5 |
| 3 | 0.015% | 3 | REAL-TIME GAMING | 0.010% | 1 |
| 4 | 0.001% | 5 | BUFFERED VIDEO STREAMING | 0.001% | 5 |
| 5 | 0.05% | 1 | IMS SIGNALING | 0.01% | 2 |
| 6 | 0.03% | 6 | VIDEO, DATA | 0.01% | 4 |
| 7 | 0.015% | 7 | VOICE, LIVE VIDEO, GAMING | 0.02% | 5 |
| 8 | 0.02% | 8 | VIDEO, DATA | 0.05% | 6 |
| 9 | 0.03% | 9 | | 0.05% | 7 |

NEGOTIATED RADIO LINK PROPERTIES AMONG WIRELESS ACCESS NODES

TECHNICAL FIELD

Aspects of this disclosure are related to the field of wireless communications, and in particular to control of traffic in wireless cellular voice and data networks.

BACKGROUND

Wireless communication systems provide wireless access to communication services by using wireless access nodes. In many examples, such as cellular communication networks, these wireless access nodes are distributed over a large geographic areas to provide access to user devices which can roam throughout the geographic areas. The wireless access can include phone calls, voice communications, data communications, text messaging, multimedia communications, and other communications.

Various layers of network processing can be included in the wireless access, such as physical wireless layers, link layers, transmission layers, application layers, and the like. Packets can be exchanged between the user devices to provide the various services and communication types. These packets are processed and handled at the various network layers, such as in one or more network stacks associated with data communications. However, in wireless systems, such as the wireless access nodes mentioned above, an additional radio link layer can be employed which carries traffic over the wireless links associated with the wireless access. This radio link layer can have various properties associated therewith, such as protocol data unit (PDU) sizes (also called packet data unit sizes). However, the particular PDU size employed by a wireless access node can lead to high packet retransmissions between the user devices and the wireless access nodes which can increase performance degradation in wireless communication systems.

OVERVIEW

Systems, methods, apparatuses, and software for operating a wireless access node are provided herein. In one example, a method includes providing wireless access from the wireless access node for one or more wireless devices using an initial protocol data unit (PDU) size for at least a portion of the wireless access. The method also includes receiving wireless transmission metrics transferred by a second wireless access node, and establishing a new PDU size for the portion of the wireless access at the wireless access node based at least on the wireless transmission metrics.

In another example, a wireless access node is presented. The wireless access node includes a transceiver configured to provide wireless access from the wireless access node for one or more wireless devices using an initial PDU size for at least a portion of the wireless access. The wireless access node includes a control interface configured to receive wireless transmission metrics transferred by a second wireless access node. The wireless access node includes processing circuitry configured to establish a new PDU size for the portion of the wireless access at the wireless access node based at least on the wireless transmission metrics.

In another example, a method of operating a wireless access node is provided. The method includes providing wireless access from the wireless access node for one or more wireless devices using initial PDU sizes corresponding to particular Quality of Service Class Identifiers (QCIs) of the wireless access, receiving wireless performance metrics transferred by a second wireless access node comprising one or more of retransmission rates, transmission latencies, and PDU sizes employed in wireless access at the second wireless access node, and establishing new PDU sizes for ones of the particular QCIs of the wireless access of the wireless access node based at least on the wireless performance metrics.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
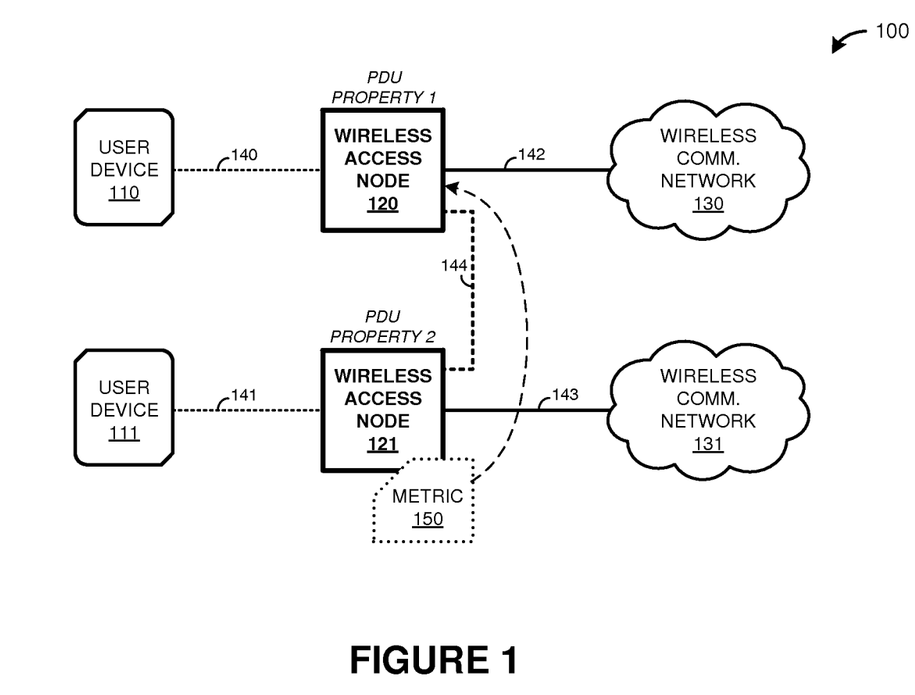
FIG. 1 is a system diagram illustrating a communication system.

FIG. 1 is a system diagram illustrating communication system 100. System 100 includes user devices 110 and 111, wireless access nodes 120-121, and cellular communication networks 130-131. User device 110 and wireless access node 120 communicate over link 140. User device 111 and wireless access node 121 communicate over link 141. Wireless access node 120 and wireless communication network 130 communicate over link 142. Wireless access node 121 and wireless communication network 131 communicate over link 143. Although two user devices are included in FIG. 1, in other examples a different number of user devices can be included.

In operation, wireless access nodes 120-121 provide wireless access to network services for wireless communication devices, such as user devices 110-111. The network services can include phone calls, voice communications, data communications, text messaging, multimedia communications, and other communications. Each wireless link 140-141 includes various wireless properties for carrying traffic associated with associated ones of user devices 110-111. These wireless properties include such properties as protocol data unit (PDU) sizes (also called packet data unit sizes), which are used to size datagrams transmitted over the wireless links between the user devices and wireless access nodes. However, the particular PDU size employed by a wireless access node can affect retransmission rates for the traffic carried using that particular PDU size. Typically, a lower retransmission rate is desired for traffic, which leads to higher performance over a wireless link due in part to less retransmission of packets due to packet loss, packet errors, data errors, and other traffic considerations.

Wireless access node 120 can establish a PDU size as similar to second wireless access node 121 by engaging in a negotiation process with second wireless access node 121. Wireless access node 120 and wireless access node 121 can change PDU sizes used for wireless communications based on wireless transmission performance metrics exchanged over link 144. Typically, a lower retransmission rate is desired for wireless communications. Also, in some cases, matching a retransmission rate or PDU size is desired when handing over a user device from a first wireless access node to a second wireless access node. Other considerations are possible, such as tailoring PDU sizes or retransmission rates to various quality of service levels, user devices, device types, user application, user type, or other considerations. PDU sizes or other parameters can be exchanged between wireless access nodes along with wireless transmission performance metrics, such as retransmission rates or packet losses for the associated wireless links.

Figure 2:
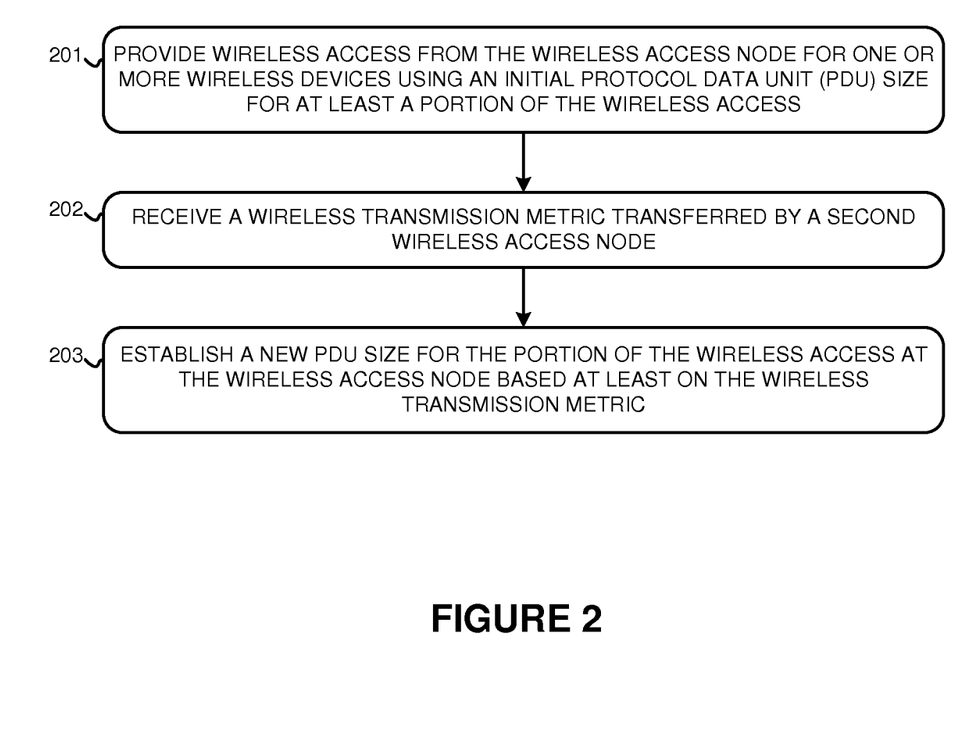
FIG. 2 is a flow diagram illustrating a method of operation of a network access node.

The examples herein enhance the operation of wireless access nodes and wireless communication systems by at least exchanging wireless transmission performance metrics for wireless links among wireless access nodes to change PDU sizes used over the wireless links. FIG. 2 is presented to further illustrate the operation of the elements of FIG. 1. FIG. 2 is a flow diagram illustrating a method of operation of wireless access node 120, although wireless access node 121 can also incorporate the operation described. The operations of FIG. 2 are referenced below parenthetically.

In FIG. 2, wireless access node 120 provides (201) wireless access from the wireless access node for one or more wireless devices using an initial PDU size for at least a portion of the wireless access. The PDU size establishes a size of datagrams used over wireless link 140 between wireless access node 120 and user device 110 or other user devices. In some examples, wireless link 140 employs a radio link control (RLC) protocol layer which uses datagrams partitioned into units that are used to transfer data over the wireless link. These datagrams can be referred to as packets or frames, although datagrams used in higher layers of a network stack can also use those designations. Nonetheless, the term 'packet' can be used herein to refer to datagrams transferred over wireless link 140 at the radio link layer. RLC is employed at a network stack layer lower than a Media Access Control (MAC) layer and tailors network traffic to the particular characteristics of a wireless link. The particular size of packets or other datagrams transferred over the wireless link is referred to as the PDU size.

Wireless access node 120 receives (202) one or more wireless transmission metrics transferred by second wireless access node 121. The wireless transmission metrics can include various indicators of performance of a wireless link of second wireless access node 121. In some examples, the wireless transmission metrics include an indication of a retransmission rate for communications handled by second wireless access node 121. The retransmission rate can include a measure of how many datagrams (such as packets) are retransmitted over wireless link 141 or other wireless links provided by second wireless access node 121 due to packet loss, bit errors, wireless link problems, fading, signal noise, or other issues. In RLC examples, the RLC layer can handle retransmissions based on an acknowledge/non-acknowledge protocol, which can consider packet sequence numbers in the retransmission considerations. Second wireless access node 121 can also indicate a PDU size currently used by second wireless access node 121 which is associated with the retransmission rate. In this example, wireless access node 120 receives metric 150 over link 144, which can comprise a control link communicatively coupling wireless access node 120 and the second wireless access node 121. This control link can comprise an LTE X2 link in some examples, although one or more intermediary nodes can be included in the control link, such as gateway nodes.

Wireless access node 120 establishes (203) a new PDU size for the portion of the wireless access at wireless access node 120 based at least on the wireless transmission metrics. In some examples, wireless access node 120 establishes the new PDU size as comparable to that of a PDU size indicated by second wireless access node 121. For example, when second wireless access node 121 indicates a lower retransmission rate than experienced by wireless access node 120 when using a particular PDU size, then wireless access node 120 can establish a new PDU size for itself that is similar to the PDU size of second wireless access node 121. Other PDU sizes can be selected by wireless access node 120 based on the wireless transmission metrics transferred by second wireless access node 121. Advantageously, the examples herein enhance the operation of wireless access nodes and wireless communication systems by exchanging wireless transmission performance metrics among wireless access nodes to change PDU sizes used over the wireless links.

Referring back to the elements of FIG. 1, user devices 110-111 each comprise transceiver circuitry, processing circuitry, and user interface elements. The transceiver circuitry typically includes amplifiers, filters, modulators, and signal processing circuitry. User devices 110-111 can also each include user interface systems, network interface card equipment, memory devices, non-transitory computer-readable storage mediums, software, processing circuitry, or some other communication components. User devices 110-111 can each be a wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. In this example, user devices 110-111 each include multiple transceiver portions or antenna portions, among other circuit and equipment elements, for communicating wirelessly with multiple wireless communication networks, using different wireless communication modes or wireless communication protocols.

Wireless access node 120 is associated with wireless communication network 130, and wireless access node 121 is associated with wireless communication network 130. Wireless access nodes 120-121 each provide wireless links for wireless access to the communication services of the associated wireless communication network over a coverage area. Wireless access nodes 120-121 each comprise RF communication and control circuitry, antenna elements, and communication routing equipment and systems. The RF communication circuitry typically includes amplifiers, filters, RF modulators, transceivers, and signal processing circuitry. Wireless access nodes 120-121 each may also include processing systems, computer-readable media, data structures, application programs, firmware, or some other form of computer-readable processing instructions. The computer-readable media may include a disk, tape, integrated circuit, server, or some other memory device, and also may be distributed among multiple memory devices. Wireless access nodes 120-121 each can also comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Wireless communication networks 130-131 each comprise communication and control systems for providing access to communication services for user devices and networks. Wireless communication networks 130-131 each can provide communication services including communication routing, link bridging, network communications, data exchange, or other communication services. In some examples, wireless communication networks 130-131 each are a cellular voice and data network that can provide voice calls, text messages, data access, or other communication services provided over cellular or wireless communication networks operated by different cellular service providers. In some examples, wireless communication networks 130-131 each includes equipment to provide wireless access to communication services within different coverage areas to user devices, route communications between content providers and user devices, and facilitate handoffs between equipment of different coverage areas, among other operations. Wireless communication networks 130-131 each can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Policy and Charging Rules Function nodes (PCRF), packet data network gateways (PGW), serving gateways (SGW), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment. Wireless communication networks 130-131 each can also include Policy and Charging Rules Function nodes (PCRF), Policy and Charging Enforcement Function nodes (PCEF), packet data network gateways (PGW), authentication, authorization and accounting (AAA) equipment, Home Subscriber Servers (HSS), home agents (HA), among other elements, including combinations thereof.

Communication links 140-141 each include one or more wireless links that can use the air or space as the transport media. Communication links 140-141 each comprise one or more wireless communication links provided over an associated wireless frequency spectrum or wireless frequency band, and can use various protocols. Communication links 140-141 each can comprise Long Term Evolution (LTE), LTE Advanced, Code Division Multiple Access (CDMA), Evolution-Data Optimized (EVDO), single-carrier radio transmission technology link (1×RTT), Global System for Mobile Communication (GSM), Universal Mobile Telecommunications System (UMTS), High Speed Packet Access (HSPA), Radio Link Protocol (RLP), radio link control (RLC) protocol layer, 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Communication links 142-143 each use metal, glass, optical, air, space, or some other material as the transport media. Communication links 142-143 each can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 142-143 can comprise various LTE control links, such as LTE X2 links, LTE S1 links, or other LTE control links, including combinations thereof. Communication links 142-143 each can be a direct link or may include intermediate networks, systems, or devices, and can include a logical network link transported over multiple physical links. In some examples, link 142-143 each comprises a wireless link that uses the air or space as the transport media.

Although one pictured link for each of links 140-143 is shown in FIG. 1, it should be understood that links 140-143 are merely illustrative to show communication modes or access pathways for the associated elements of FIG. 1. In other examples, further links can be shown, with portions of the further links shared and used for different communication sessions or different content types, among other configurations. Communication links 140-143 may each include many different signals sharing the same associated link, as represented by the associated lines in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

Figure 3:
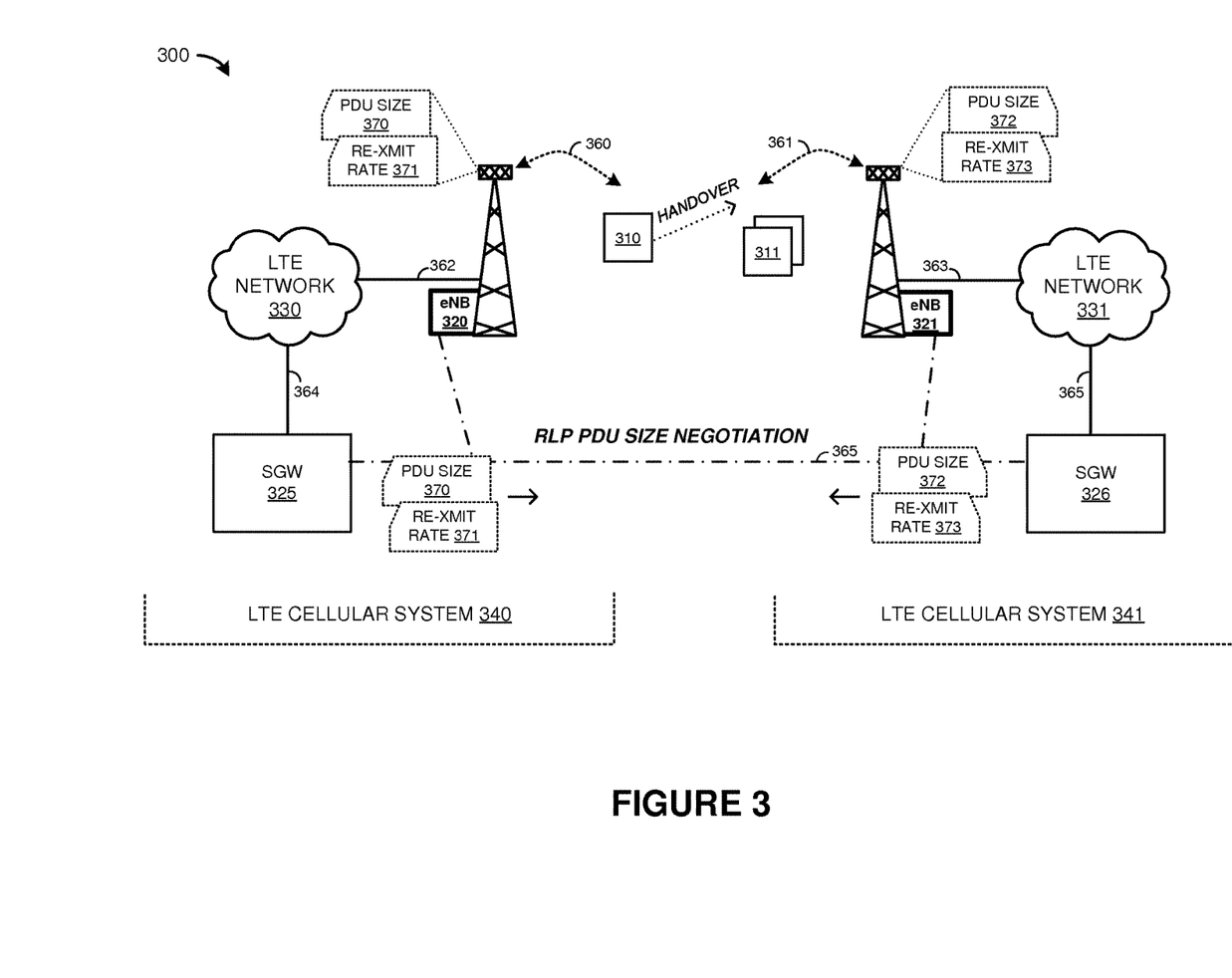
FIG. 3 is a system diagram illustrating a communication system.

As a further example, FIG. 3 is presented. FIG. 3 is a system diagram illustrating communication system 300. Communication system 300 includes two Long-Term Evolution (LTE) cellular systems, 340-341. In operation, LTE cellular systems 340-341 each provide wireless access to communication services to user devices over one or more LTE wireless links, such as links 360-361 in FIG. 3. The communication services can include data services, text messaging services, media streaming services, voice call services, or other voice and data services. In this example, LTE cellular system 340 is operated by a different service operator than LTE cellular system 341, such as different companies with user devices that receive home wireless access from an associated LTE cellular system.

LTE communication systems 340-341 each include various elements of a cellular communication system, and can include elements of other non-LTE networks and systems, such as CDMA, GSM, UMTS, and the like. LTE communication system 340 includes LTE network 330, Evolved UMTS Terrestrial Radio Access Node B (eNB) 320, and Serving Gateway (SGW) 325. LTE communication system 341 includes LTE network 331, eNB 321, and SGW 326. LTE networks 330-331 each include various routers, data systems, further eNB equipment, as well as further elements which provide cellular access to communication services over one or more geographic areas. As a part of this wireless service, one example eNB is shown in FIG. 3 for each cellular system, namely eNB 320 for system 340 and eNB 321 for system 341, although further eNB elements could be included.

In typical examples, eNB 320-321 are each a permanently-installed node with one or more antenna towers accompanied by high-volume transceiver equipment. Wireless access nodes, such as eNB 320-321, each serves a geographic area comprising local sites or buildings and handles a number of simultaneous wireless communication device sessions, such as when a part of a metro-wide wireless communication network of a communication service provider.

eNB 320-321 can each further comprise computer processing systems and equipment which can include communication or network interfaces, as well as computer systems, microprocessors, circuitry, cloud-based systems, or some other processing devices or software systems, and can be distributed among multiple processing devices. Examples of eNB 320-321 can each also include software such as an operating system, logs, databases, utilities, drivers, networking software, and other software stored on a computer-readable medium.

SGW 325-326 each include network routing and gateway elements, and can perform network routing and termination for user devices. SGW 325-326 provide anchor points for network traffic and network addressing for user devices as the user devices move throughout a geographic location served by many eNBs. SGW 325-326 also each handle handoffs or handovers of user devices between eNBs. SGW 325-326 each include computer processing systems and equipment which can include communication or network interfaces, as well as computer systems, microprocessors, circuitry, cloud-based systems, or some other processing devices or software systems, and can be distributed among multiple processing devices. Examples of SGW 325-326 can include software such as an operating system, logs, databases, utilities, drivers, networking software, and other software stored on a computer-readable medium.

User devices 310-311 each comprise a wireless user device, such as cell phone, smart phone, tablet devices, gaming device, PDA, Bluetooth speaker device, media displays, or other wireless user devices, including combinations thereof. In many examples, user devices 310-311 comprise transceiver circuitry and processing circuitry along with various user interface elements to provide a user with access to communication services of a cellular voice and data communication network, such as LTE networks 340-341. In the examples discussed herein, each of user devices 310-311 each receive service from a service provider associated with a corresponding LTE network 340-314, such as a cellular communications service provider.

Figure 4:
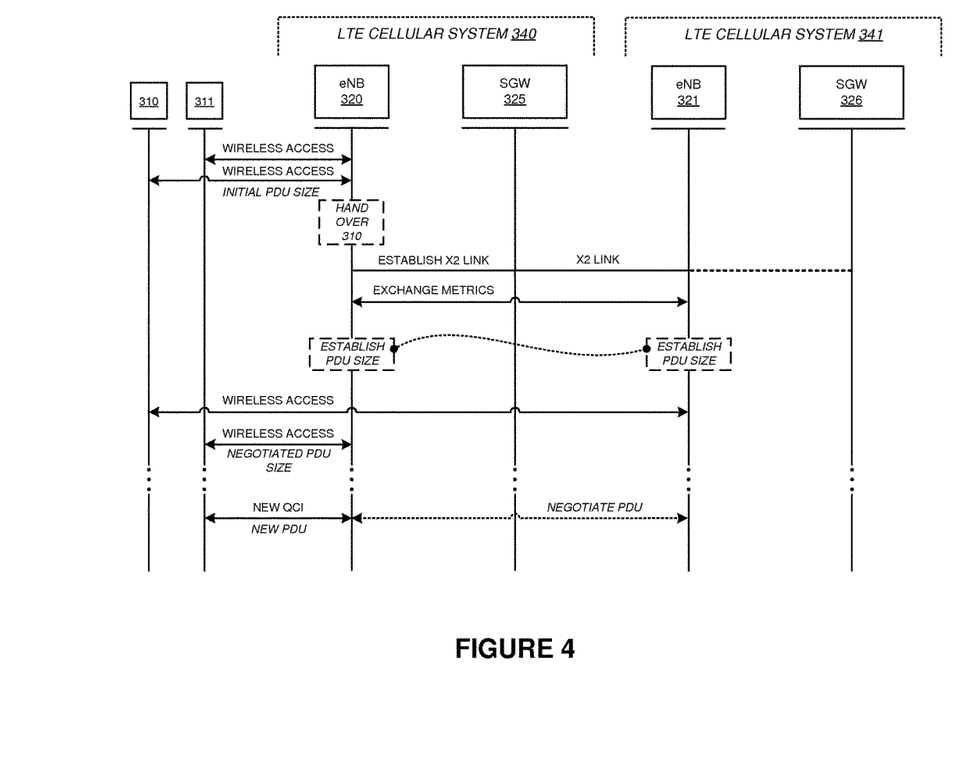
FIG. 4 is a sequence diagram illustrating a method of operation of a communication system.

FIG. 4 is a sequence diagram illustrating example operations of communication system 300. In FIG. 4, eNB 320 provides wireless access to communication services for user devices 310 and 311. Wireless link 360 is employed by eNB 320 to provide the wireless access, such as using one or more LTE wireless links. The communication services can include voice calls, voice over IP (VoIP) communications, voice over LTE (VoLTE) communications, media streaming, text messaging, media messaging, or data communications, including combinations thereof. These communications are typically routed through associated LTE network 330 or 331 for delivery to other user devices, network content providers, network nodes, or other network and communication elements. Further example communication services are listed in table 600 of FIG. 6 under the column labeled "type of communication."

An initial protocol data unit or packet data unit (PDU) size is employed over wireless link 360 for the communications associated with user devices 310-311. This PDU size is employed for a radio link control (RLC) protocol layer which is used for transferring communications over the wireless link between eNB 320 and user devices 310-311. The PDU size can indicate a size in bytes of a frame or packet size which is used by the RLC to partition communications into packets or frames. During exchange of the wireless communications the particular PDU size employed by eNB 320 can affect retransmission rates for the traffic carried using that particular PDU size. Typically, a lower retransmission rate is desired for traffic, which leads to higher performance over a wireless link due in part to less retransmission of packets due to packet loss, packet errors, data errors, and other performance considerations.

In RLC examples, the RLC layer can handle retransmissions based on an acknowledge/non-acknowledge scheme. Once an RLC packet is transmitted to a user device, if the RLC layer receives a non-acknowledgement (NACK) message or does not get any response from the user device within a certain amount of time, the associated RLC packet in a retransmission buffer of the eNB gets transmitted again to the user device. If the RLC layer receives an acknowledgement (ACK) message, then the associated RLC packet in a retransmission buffer is discarded. Retransmissions take time to occur, creating delays, and also consume bandwidth of a wireless link.

During the wireless access for user device 310, a handover or handoff to another eNB might be desired, such as to eNB 321. This handoff can be due to changing signal conditions associated with wireless links 360-361, such as when user device 310 experiences signal conditions below a threshold level and wireless link 361 experiences signal conditions above a threshold level. This handoff can be due to movement of user device 310, such as when user device is leaving a coverage area of eNB 320 and entering a coverage area of eNB 321. Other handoff considerations are possible. In addition, eNB 320 and eNB 321 might be operated by different service providers or service companies, in which case user device 310 might desire to roam from a home network associated with eNB 320 onto a roaming network associated with eNB 321, or vice versa. Alternatively, eNB 320 and eNB 321 might be operated by the same service provider.

The PDU size used for communications of user device 310 by eNB 320 might be different than the PDU size which will be used for communications of user device 310 on eNB 321 or different than a present PDU size used by eNB 321 for other communications. When user device 310 changes from receiving service from eNB 320 to eNB 321, wireless communication performance might change, and thus a quality of service experienced by associated communications for user device 310 can vary once the handoff is complete to eNB 321. In FIG. 4, a negotiation process is performed during a handoff process among eNB 320 and eNB 321 to establish a common or similar PDU size. The handoff communications can include exchange of performance metrics 370-373, among other information discussed herein.

As a part of this negotiation process, an LTE X2 link is established between eNB 320 and eNB 321. In some examples, this X2 link is routed through any of SGW 325 or SGW 326, although a SGW may not be involved in other examples. In FIG. 3, the X2 link is shown as link 365, and portions of link 365 can be carried over links 362-365. Once the X2 link is established, then eNB 320 and eNB 321 exchange performance metrics 370-373 for wireless transmissions associated with wireless links, such as with wireless links 360-361, among others. The performance metrics can include PDU sizes currently employed, as well as associated retransmission rates that indicate packet retransmissions over the RLC layer of the wireless links due to packet loss, packet errors, data errors, and other performance considerations. Other performance metrics can be exchanged, such as transmission latency over wireless links, which can be affected by PDU sizes.

A PDU size is then established by eNB 320 for communications handled by eNB 320. Likewise, a PDU size can be established by eNB 321 for communications handled by eNB 321. Typically, an eNB desires to establish a PDU size which leads to a lower retransmission rate. However, the retransmission rate can vary due to PDU size due to current RF conditions, nearby objects, terrain, or structures, movement of user devices, or other factors. Additionally, the retransmission rate can vary due to PDU size for the type of communications carried, such as the various types highlighted in FIG. 6, which include voice communications, media communications, data communications, and various control and signaling communications. However, there are examples where a PDU size may be established which increases a retransmission rate, such as when eNB desires to provide a lesser quality of service to a user device due to service agreements, non-priority types of communications, or other considerations.

In this example, eNB 320 processes the performance metrics received over the X2 link from eNB 321, such as the retransmission rates experienced by eNB 321 for a current PDU size used by eNB 321. When the retransmission rate experienced by eNB 321 is lower than the retransmission rate experienced by eNB 320, then eNB 320 can select the PDU size transferred by eNB 321 as a new PDU size to be used by eNB 320. When the retransmission rate experienced by eNB 321 is higher than a retransmission rate experienced by eNB 320, then eNB 320 can keep the PDU size currently used by eNB 320 unchanged. Likewise, when the retransmission rate experienced by eNB 320 is lower than the retransmission rate experienced by eNB 321, then eNB 321 can select the PDU size transferred by eNB 320 as a new PDU size to be used by eNB 321.

In further examples, latency metrics for communications handled by eNB 320 or eNB 321 can be exchanged over the X2 link, and a PDU size associated with a lower latency can be selected for use by eNB 320 and eNB 321. The latency metrics can indicate transmission delays experienced for communications over a wireless link, which can be affected by PDU size. For example, larger PDU sizes can increase latency, while smaller PDU sizes can decrease latency. However, a particular PDU size selected for low latency, for example, might lead to increased retransmission rates. Thus, latency metrics and retransmission rates can be considered in selecting a PDU size.

Wireless access can then proceed at each of eNB 320 and eNB 321 according to the new PDU sizes selected. In some examples, the PDU sizes are selected to be the same among eNB 320 and eNB 321 so that any handoffs of user devices among eNB 320 and eNB 321 will minimize any performance degradation, latency changes, or retransmission increases for communications after the handoffs. In the example where user device 310 is handed off to eNB 321, eNB will employ the negotiated PDU size for at least user device 310. Similarly, user device 311 which remains on eNB 320 will also receive service using the negotiated PDU size.

Figure 6:
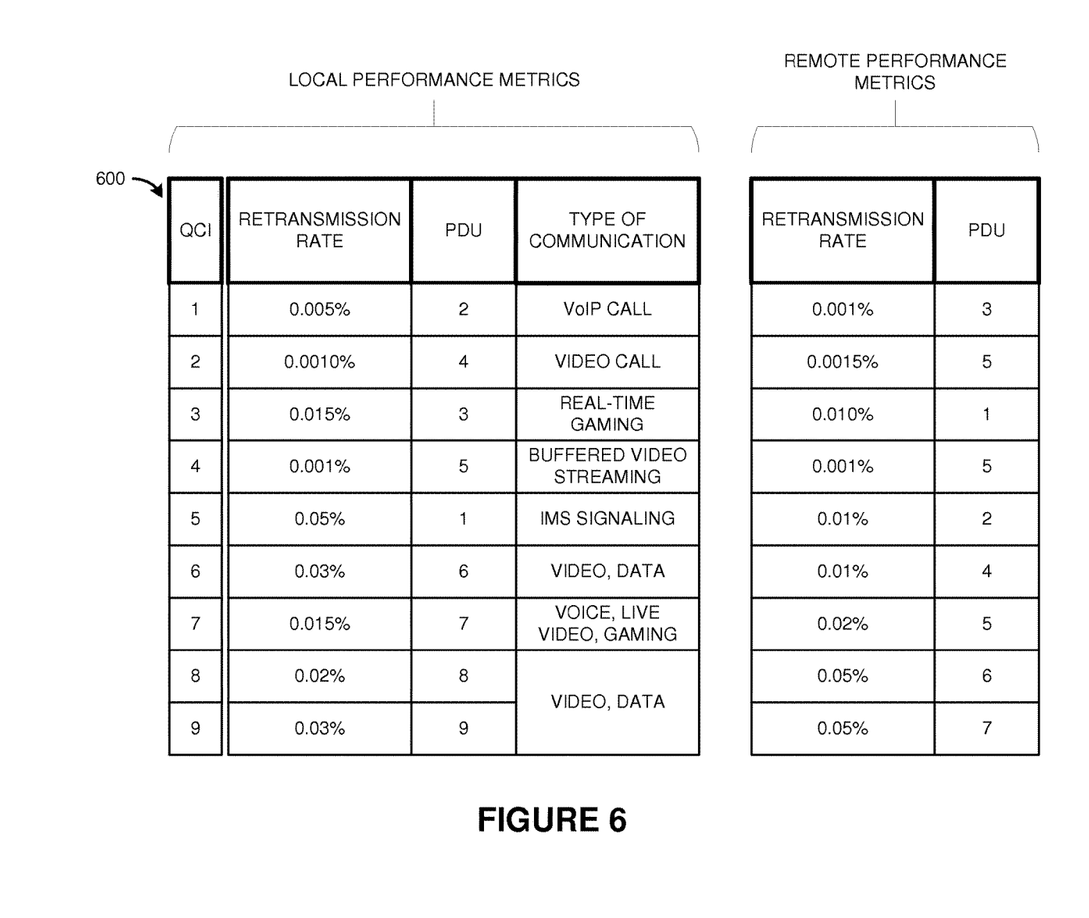
FIG. 6 illustrates a data structure indicating various wireless properties.

In addition to selecting a PDU size among eNB 320 and eNB 321 based on retransmission rate or latency performance metrics, other considerations can be taken into account. For example, FIG. 6 illustrates table 600 indicating several different service levels arranged by a type of communication. A QCI column indicates a class or service or service level, specifically, a Quality of Service Class Identifier (QCI) of the wireless access. These QCIs are categorized into 9 different rows each corresponding to a different service level for wireless communications of user devices. These service levels can drive performance selections for user devices based on types of communications which have originations/destinations of different user applications executed on a user device.

As seen in FIG. 6, different local retransmission rates correspond to different PDU sizes selected for each QCI. The local retransmission rates and local PDU sizes can be for an eNB such as eNB 320. Also, remote performance metrics can indicate retransmission rates and PDU sizes for another eNB, such as eNB 321. These performance metrics can be exchanged by eNB 320 and eNB 321 over an X2 link or other control link, such as found in FIG. 3. eNB 320 and eNB 321 can each select PDU sizes from among the various PDU sizes of both the local and remote PDU sizes to minimize the retransmission rates for each QCI in table 600. In other examples, a retransmission rate is desired to be maximized, such as to provide a lower quality of service for lesser priority communications, and PDU sizes can be selected to provide higher retransmission rates for a particular QCI. In a particular example, for VoIP calls (QCI-1), local eNB 320 can select a PDU size of 3 which corresponds to a lower retransmission rate of 0.001% as determined by the remote performance metrics. In another example, for buffered streaming video (QCI-4), eNB 320 can keep the PDU size unchanged because the retransmission rate is the same at the remote eNB. In yet another example, for video/data (QCI-8), local eNB 320 can keep the PDU size unchanged because the retransmission rate is the lower than at remote eNB 321. However, remote eNB 321 might select the PDU size of local eNB 320 due to the higher retransmission rate at remote eNB 321. Other considerations for selecting a PDU size according to retransmission rates, latencies, or other performance metrics of another eNB can be employed.

Figure 5:
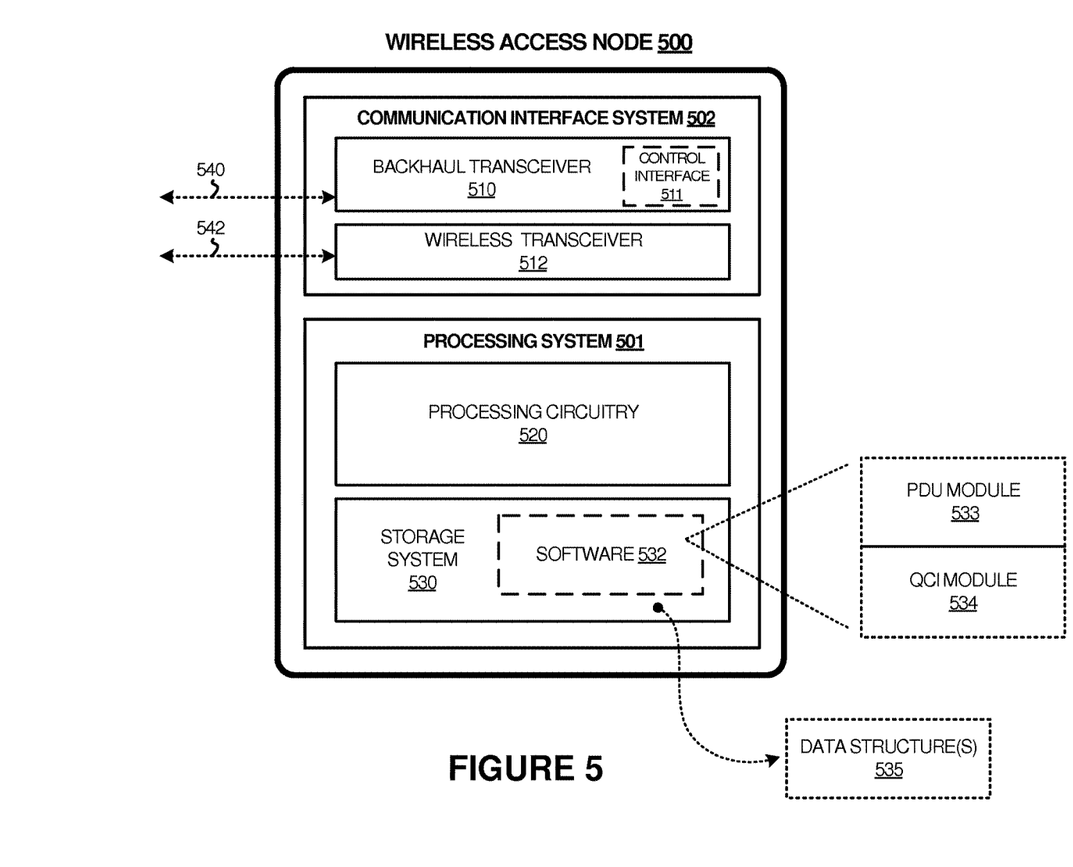
FIG. 5 is a block diagram illustrating a network access node.

FIG. 5 is a block diagram illustrating a detailed view of wireless access node 500. Wireless access node 500 can include equipment and systems as discussed herein for wireless access nodes 120-121 in FIG. 1 and eNBs 320-321 in FIG. 3, although variations are possible. Wireless access node 500 includes processing system 501 and communication interface system 502. Processing system 501 further includes processing circuitry 520 and storage system 530. Communication interface system 502 further includes backhaul transceiver 510 and wireless transceiver 512. In operation, processing circuitry 520 is operatively linked to backhaul transceiver 510, wireless transceiver 512, and storage system 530 by one or more communication interfaces, which can comprise a bus, discrete connections, network links, software interfaces, or other circuitry. Wireless access node 500 can be distributed or consolidated among equipment or circuitry that together forms the elements of wireless access node 500. Wireless access node 500 can optionally include additional devices, features, or functionality not discussed here for purposes of brevity.

Communication interface system 502 includes one or more network interfaces. In wireless access node 500, communication interface system 502 includes backhaul transceiver 510 and wireless transceiver 512. Backhaul transceiver 510 includes at least one wired or wireless transceiver for providing communication links for communication with elements of a cellular voice and data network, such as eNBs and various routers, gateways, or back-end systems. These communication links, such as link 540, can comprise Ethernet interfaces, IP interfaces, T1 interfaces, or other local or wide area network communication interfaces which can communicate over a communication link, or other links as indicated above for communication links 142-143, including variations thereof. Backhaul transceiver 510 can include network interface card equipment, transceivers, routers, bridges, modems, and other communication circuitry. Backhaul transceiver 510 can include impedance matching elements, physical layer (PHY) interface circuitry, antennas, power amplifiers, RF circuitry, receivers, transmitters, network interface card equipment, modems, and other communication circuitry. In this example, backhaul transceiver 510 communicates over link 540, which can comprise more than one communication link. Backhaul transceiver 510 also includes control interface 511 which is employed to intercommunicate with one or more other wireless access nodes. In some examples, control interface 511 comprises various LTE control links, such as LTE X2 links, LTE S1 links, or other LTE control links, including combinations thereof. In some examples, elements of control interface 511 are included in software 532, such as in virtualized control interface examples.

Wireless transceiver 512 includes one or more wireless interfaces or communication transceivers for communicating over cellular communication networks, such as links 140-141 of FIG. 1. Wireless transceiver 512 includes antennas, power amplifiers, RF circuitry, transceivers, network interface card equipment, modems, and other communication circuitry. In this example, wireless transceiver 512 communicates over link 542, which can include any cellular communication link as described herein, such as LTE links, CDMA links, GSM links, or other cellular communication links, including combinations and variations thereof. Link 542 can include one or more communication links as described for links 140-141 in FIG. 1 and links 360-361 in FIG. 3.

Processing circuitry 520 can comprise one or more microprocessors and other processing circuitry that retrieves and executes software 532 from storage system 530. Processing circuitry 520 can be implemented within a single processing device but can also be distributed across multiple processing devices or sub-systems that cooperate in executing program instructions. Examples of processing circuitry 520 include general purpose central processing units, application specific processors, and logic devices, as well as any other type of processing device, combinations, or variations thereof. In some examples, portions of processing circuitry 520 is physically separate from some elements of wireless access node 500 and area included in remote servers, cloud-based processing systems, or virtualized computing systems.

Storage system 530 can comprise any non-transitory computer readable storage media capable of storing software 532 that is executable by processing circuitry 520. Storage system 530 also includes data structures 535 which include one or more databases, tables, lists, or other data structures that relate policy factors of cellular networks to local policies for communications of user devices and media nodes. Storage system 530 can include volatile and nonvolatile, removable and non-removable media implemented in any method or technology for storage of information, such as computer readable instructions, data structures, program modules, or other data. Storage system 530 can be implemented as a single storage device but can also be implemented across multiple storage devices or sub-systems colocated or distributed relative to each other. Storage system 530 can comprise additional elements, such as a controller, capable of communicating with processing circuitry 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 532 can be implemented in program instructions and among other functions can, when executed by wireless access node 500 in general or processing circuitry 520 in particular, direct wireless access node 500, processing system 501, or processing circuitry 520 to provide wireless access from wireless access node 500 for one or more wireless devices using an initial protocol data unit (PDU) size for at least a portion of the wireless access, receive wireless transmission metrics transferred by a second wireless access node, and establish a new PDU size for the portion of the wireless access at wireless access node 500 based at least on the wireless transmission metrics, among other operations. Software 532 can include additional processes, programs, or components, such as operating system software, database software, or application software. Software 532 can also comprise firmware or some other form of machine-readable processing instructions executable by elements of processing system 501, such as processing circuitry 520.

In at least one implementation, the program instructions can include PDU module 533 and QCI module 534. PDU module 533 provides wireless access from wireless access node 500 for one or more wireless devices using an initial protocol data unit (PDU) size for at least a portion of the wireless access, receives wireless transmission metrics transferred by a second wireless access node, and establishes a new PDU size for the portion of the wireless access at wireless access node 500 based at least on the wireless transmission metrics. QCI module 534 establishes various quality of service levels for wireless devices that receive wireless access through wireless access node 500. QCI module 534 can establish different PDU sizes for the various quality of service levels, such as found in FIG. 6, among other distinctions such as device type, user identity, traffic type, application type, or other quality of service distinctions, including combinations thereof.

In general, software 532 can, when loaded into processing circuitry 520 and executed, transform processing circuitry 520 overall from a general-purpose computing system into a special-purpose computing system customized to provide wireless access from wireless access node 500 for one or more wireless devices using an initial protocol data unit (PDU) size for at least a portion of the wireless access, receive wireless transmission metrics transferred by a second wireless access node, and establish a new PDU size for the portion of the wireless access at wireless access node 500 based at least on the wireless transmission metrics, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access node, the method comprising:
    providing wireless access from the wireless access node for one or more wireless devices using an initial protocol data unit (PDU) size for at least a portion of the wireless access; and
    exchanging retransmission rates and current PDU sizes between the wireless access node and a second wireless access node to establish a new PDU size for the portion of the wireless access at the wireless access node based at least on the wireless retransmission rates.

2. The method of claim 1, further comprising:
    when the retransmission rate for the wireless access provided at the second wireless access node is lower than the retransmission rate for the portion of the wireless access provided at the wireless access node, then selecting the new PDU size according to the current PDU size for the wireless access provided at the second wireless access node.

3. The method of claim 1, further comprising:
    receiving the wireless retransmission rate and current PDU size transferred by the second wireless access node over a Long Term Evolution (LTE) X2 control link communicatively coupling the wireless access node and the second wireless access node.

4. The method of claim 1, wherein the wireless access node is included in a cellular communication system operated by a first service provider and the second wireless access node is included in a cellular communication system operation by a second service provider different than the first service provider.

5. The method of claim 1, wherein the initial PDU size and the new PDU size each comprise a radio link control (RLC) protocol layer PDU size.

6. The method of claim 1, further comprising:
    receiving the wireless retransmission rate and current PDU size during a handoff process for a first wireless device from the wireless access node to the second wireless access node.

7. The method of claim 1, further comprising:
    establishing a plurality of PDU sizes, each corresponding to a particular Quality of Service Class Identifier (QCI) of the wireless access;
    negotiating different sizes for the plurality of PDU sizes with the second wireless access node to select ones of the plurality of PDU sizes with lower retransmission rates among the wireless access node and the second wireless access node.

8. A wireless access node, comprising:
    a transceiver configured to provide wireless access from the wireless access node for one or more wireless devices using an initial protocol data unit (PDU) size for at least a portion of the wireless access; and
    processing circuitry configured to exchange retransmission rates and current PDU sizes between the wireless access node and a second wireless access node and establish a new PDU size for the portion of the wireless access at the wireless access node based at least on the wireless retransmission rates.

9. The wireless access node of claim 8, further comprising:
    when the retransmission rate for the wireless access provided at the second wireless access node is lower than the retransmission rate for the portion of the wireless access provided at the wireless access node, then the processing circuitry configured to select the new PDU size according to the current PDU size for the wireless access provided at the second wireless access node.

10. The wireless access node of claim 8, further comprising:
    a control interface configured to receive the wireless retransmission rate and current PDU size transferred by the second wireless access node over a Long Term Evolution (LTE) X2 control link communicatively coupling the wireless access node and the second wireless access node.

11. The wireless access node of claim 8, wherein the wireless access node is included in a cellular communication system operated by a first service provider and the second wireless access node is included in a cellular communication system operation by a second service provider different than the first service provider.

12. The wireless access node of claim 8, wherein the initial PDU size and the new PDU size each comprise a radio link control (RLC) protocol layer PDU size.

13. The wireless access node of claim 8, further comprising:
    a control interface configured to receive the wireless retransmission rate and current PDU size during a handoff process for a wireless device from the wireless access node to the second wireless access node.

14. The wireless access node of claim 8, further comprising:
    the processing circuitry configured to establish a plurality of PDU sizes, each corresponding to a particular Quality of Service Class Identifier (QCI) of the wireless access;
    the processing circuitry configured to negotiate different sizes for the plurality of PDU sizes with the second wireless access node to select ones of the plurality of PDU sizes with lower retransmission rates among the wireless access node and the second wireless access node.

15. A method of operating a wireless access node, the method comprising:
- providing wireless access from the wireless access node for one or more wireless devices using initial protocol data unit (PDU) sizes corresponding to particular Quality of Service Class Identifiers (QCIs) of the wireless access;
- receiving wireless performance metrics transferred by a second wireless access node comprising one or more of retransmission rates, transmission latencies, and current PDU sizes employed in wireless access at the second wireless access node; and
- establishing new PDU sizes for ones of the particular QCIs of the wireless access of the wireless access node based at least on the wireless performance metrics.

16. The method of claim 15, wherein the initial PDU sizes and the new PDU sizes each comprise a radio link control (RLC) protocol layer PDU size, and further comprising:
- receiving the wireless performance metrics transferred by the second wireless access node over a Long Term Evolution (LTE) X2 control link communicatively coupling the wireless access node and the second wireless access node.

* * * * *